United States Patent [19]

Chandler

[11] Patent Number: 4,932,494

[45] Date of Patent: Jun. 12, 1990

[54] VEHICLE SECURITY SYSTEM

[76] Inventor: David R. Chandler, 87 Gladstone Road, Boscombe, Bournemouth, Great Britain, BH7 6HD

[21] Appl. No.: 275,051
[22] PCT Filed: Jan. 21, 1988
[86] PCT No.: PCT/GB88/00039
§ 371 Date: Nov. 14, 1988
§ 102(e) Date: Nov. 14, 1988
[87] PCT Pub. No.: WO88/05391
PCT Pub. Date: Jul. 28, 1988

[30] Foreign Application Priority Data

Jan. 22, 1987 [GB] United Kingdom ............... 8701388
Jul. 24, 1987 [GB] United Kingdom ............... 8717602

[51] Int. Cl.$^5$ ............................................. B60R 25/00
[52] U.S. Cl. ..................................... 180/287; 180/284
[58] Field of Search ................. 180/277, 284, 287; 70/243; 340/63; 137/351; 307/10 AT

[56] References Cited

U.S. PATENT DOCUMENTS

| 3,550,717 | 12/1970 | Doty, Jr. .................... | 180/284 |
| 3,968,666 | 7/1976 | MacKinnon ................. | 70/243 |
| 4,347,545 | 8/1982 | Weishaupt et al. .......... | 180/287 |
| 4,463,340 | 7/1984 | Adkins et al. ............... | 180/287 |
| 4,566,556 | 1/1986 | Wodeslavsky ............... | 180/287 |
| 4,682,062 | 7/1987 | Weinberger ................. | 180/287 |
| 4,690,240 | 9/1987 | Russo ......................... | 180/287 |
| 4,745,897 | 5/1988 | Tejeda ........................ | 180/287 |

FOREIGN PATENT DOCUMENTS 2562012 10/1985 France .
2568835 2/1986 France .
2144249 2/1985 United Kingdom .

*Primary Examiner*—Richard A. Bertsch
*Attorney, Agent, or Firm*—Edwin D. Schindler

[57] ABSTRACT

A vehicle security system is disclosed which includes a code entry module and a decoding module. The decoding module is preferably a sealed module mounted within the fuel tank of the vehicle and arranged so as normally to disable the vehicle fuel system (e.g., a fuel pump or fuel valve mounted within the fuel tank) and further arranged to respond to a predetermined access code being entered on the code entry module to enable the fuel system for normal running of the vehicle.

10 Claims, 3 Drawing Sheets

VEHICLE SECURITY SYSTEM

This invention relates to a security system for a vehicle, serving to disable the fuel system.

Known vehicle security systems generally rely upon door locks to prevent theft of the vehicle. Nowadays this does not afford sufficient protection, because all too often a thief has the expertise to break into the vehicle, "hot wire" the ignition and drive away.

In accordance with this invention, there is provided a vehicle security system comprising a code entry module and a decoding module, the decoding module being a sealed module mounted within or for mounting within a fuel tank of the vehicle and arranged so as normally to disable the vehicle fuel system and further arranged to respond to a predetermined access code being entered on the code entry module to enable the fuel system for normal running of the vehicle.

In a preferred embodiment, the code entry module preferably comprises a keypad requiring a predetermined 4-digit code to be entered. Only if the correct code is entered will outputs be activated for energising the vehicle fuel pump, or opening the fuel pump valve, and for enabling the ignition coil.

An embodiment of this invention will now be described by way of example only and with reference to the accompanying drawings, in which.

Figure 1:
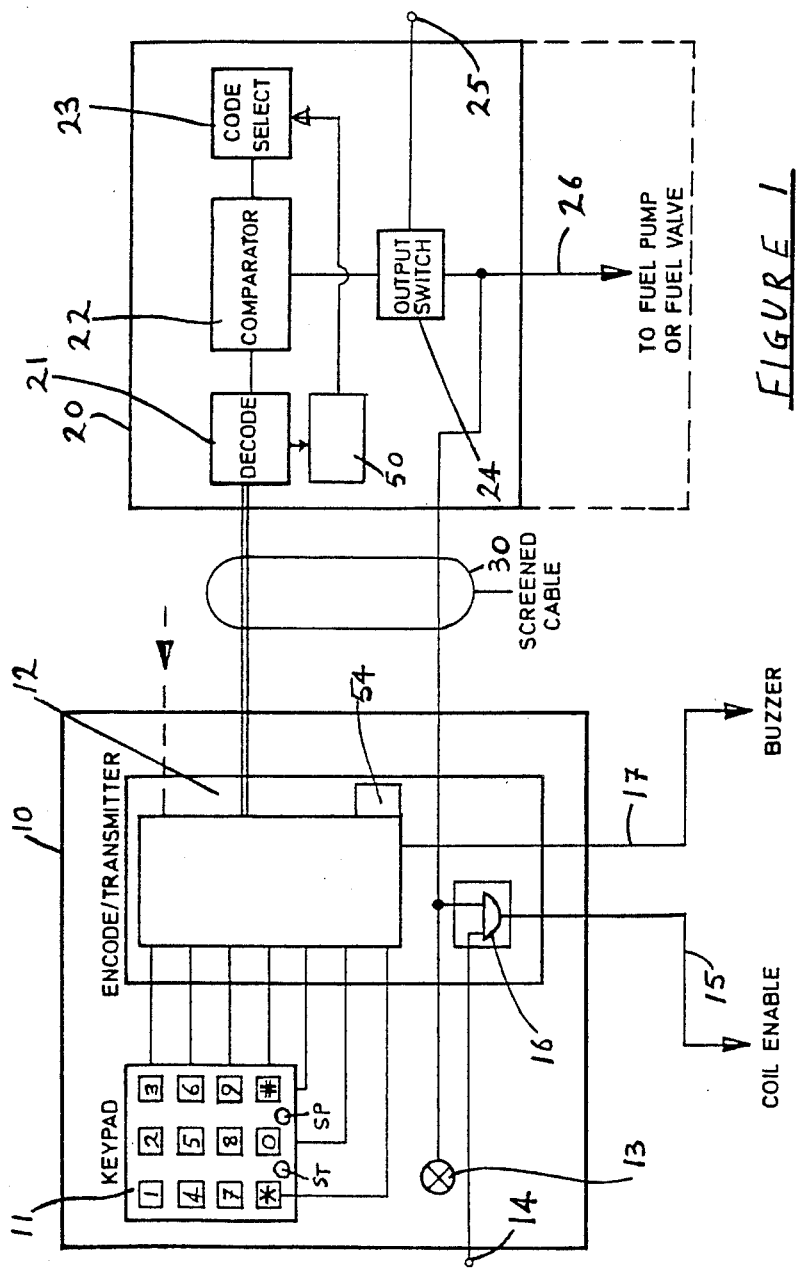
FIG. 1 is a block diagram of a vehicle security system.

Referring to FIG. 1 of the drawings, there is shown a security system for a vehicle comprising a keypad module 10 and a fuel module 20. The keypad module 10 is intended to be mounted on the vehicle facia and comprises a keypad 11 for entry of a predetermined numerical access code to enable the vehicle fuel system, and an encoder/transmitter unit 12 coupled to the keypad output terminals. The keypad module 10 is a self-contained unit incorporating the electronics and an indicator LED 13. This unit also has a termination 14 for receiving a 6 volt or 12 volt supply, a termination 15 providing a signal from an AND gate 16 for enabling the ignition coil and a termination 17 for providing a signal to energise an external audible warning device such as a buzzer. The keypad module 10 is connected to the fuel module 20 by a 3-wire screened cable 30.

The fuel module 20 is a totally encapsulated or sealed unit intended to be mounted inside the fuel tank to inhibit any tampering. The fuel module comprises a decode circuit 21 connected to one input of a comparator 22, the other input of which is connected to a code select unit 23 (into which an individual code is preset at manufacture). The output of comparator 22 controls a switch 24 serving to connect the 6 or 12 volt supply on terminal 25 to a fuel pump or fuel valve via a terminal 26 and, over the third line of the cable 30, to the indicator LED 13 and to one input of AND gate 6, which receives the power supply at its other input.

In use of the vehicle security system so far described with reference to FIG. 1, the fuel system must be enabled before the vehicle can be driven away. When the ignition switch is turned on, power is applied to both the keypad module and the fuel module to power the electronics in each of these. The power feed to the vehicle fuel pump or fuel valve is however still interrupted, so that no fuel is available to the engine. In addition, output termination 15 from the keypad module is inactive so that the ignition coil is disabled. This prevents starting of the engine and any short running of the vehicle relying on fuel left in the carburettor and fuel line, in particular avoiding the possibility of the vehicle running out of fuel and stopping in a traffic condition.

The correct 4-digit access code must be entered on the keypad 11, in reponse to which the encoder/transmitter unit 12 sends a corresponding signal over the cable 30 to the decode circuit 21 of the module. This circuit decodes the received signal and passes it to the comparator 22 for the received code to be compared with the individual code set in the code select unit 23. Only if the codes agree, the comparator 22 operates the switch 24 to feed power to the fuel pump or fuel valve, and also to return a signal to the keypad module serving to energise the LED 13 and provide a coil enable signal on termination 15 (via AND gate 16). However, if an incorrect code is entered on the keypad 11, module 20 relays a signal to unit 12 which energises the output termination 17 to activate the audible warning device: this can only be silenced by turning off the ignition switch.

Figure 2:
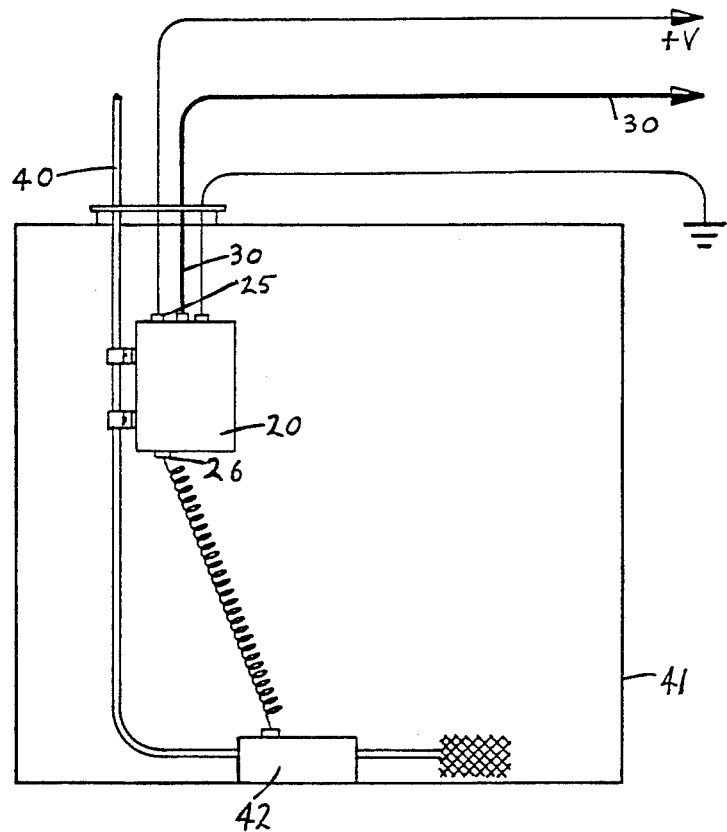
FIG. 2 is a diagram showing a fuel module of the security system mounted within a vehicle fuel tank and controlling a fuel pump also mounted in the tank.
Figure 3:
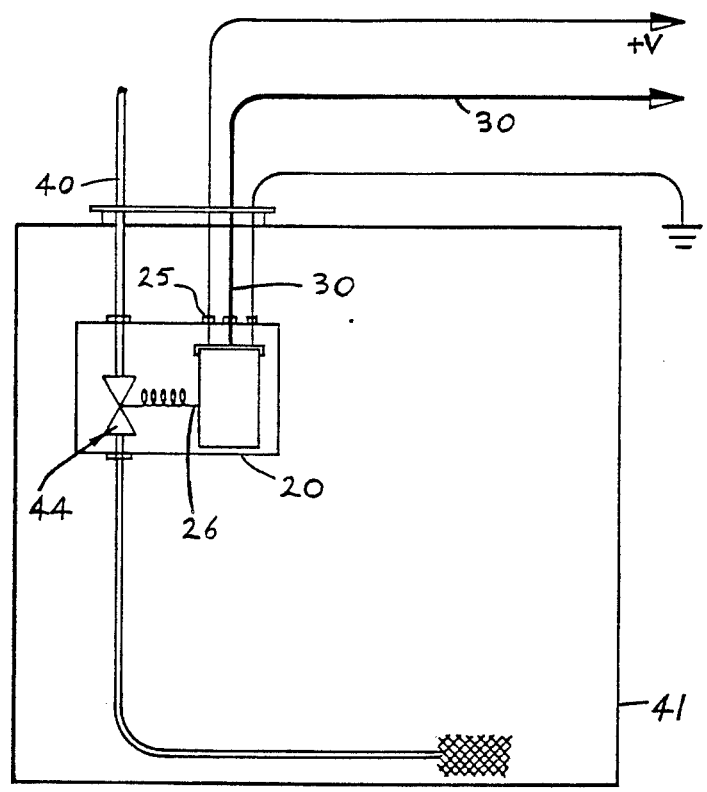
FIG. 3 is a diagram showing a fuel module incorporating a fuel valve and mounted within a vehicle fuel tank.

Referring to FIG. 2, the encapsulated fuel module may be supplied complete with means e.g. steel clips, to fasten it to the fuel outlet pipe 40 from the fuel tank 41, the fuel pump being shown at 42. Referring to FIG. 3, the fuel module may instead include an integral fuel valve 44 having pipe connectors for fitting in-line with the fuel outlet pipe 40. The fuel module may in either case be mounted externally of the fuel tank, but would then risk being by-passed.

The system may be simplified by incorporating the encoder/transmitter unit in the fuel module, although then the cable 30 would require 8 wires instead of the 3 needed for the arrangement shown in FIG. 1.

The system may be modified so as to energise the audible warning output 17 should the ignition be turned on but no code entered within a predetermined time delay of say 20 seconds.

The system may be modified so as to illuminate a fault indicator should the cable 30 between the keypad and fuel modules be severed.

The encoder/transmitter electronics may be provided with one or more additional inputs 18 serving, if energised, to energise the audible warning output 17. For example, a switch could be fitted to the vehicle radio and arranged to be actuated by removal of that radio, to cause the audible warning to be given.

A modified system may be arranged with means 50 such that the required access code can be changed by the vehicle owner, using the keypad. Once the access code has been changed, the system remembers the previous access code until the new code has been used say three successive times, in order to guard against the owner forgetting the new code. Thus until the new code has been used three successive times, the previous code can be used to enable the system. A special unit may be made available to restricted parties, e.g. motoring associations, to give access should the owner have forgotten both the new and previous access code.

Preferably the security system can be over-ridden by the owner entering a predetermined code on the keypad, so that the vehicle can be operated by another person (e.g. while the vehicle is in the garage for servicing or repair) without the owner having to divulge the access code.

Preferably a unit 54 of the security system allows say three successive attempts to access it on the keypad. If all three attempts are unsuccessful, the system disables the keypad entries for a predetermined period, say 15 minutes, regardless of whether the ignition is switched off and on.

Optionally the system may be arranged so that the usual ignition switch can be dispensed with from the vehicle. Thus the keypad may include "engine start" and "engine stop" keys ST,SP which are operative only after the system has been enabled by entry of the code.

The vehicle security system which has been described provides effective security for the vehicle in that it is particularly difficult for an unauthorised person to over-ride it.

Whilst in the example shown signalling between the code entry module and the decoding module is effected by hard-wiring, instead fibre optics, radio transmission or any other form of communication can be employed.

I claim:

1. A vehicle security system comprising a code entry module and a decoding module, the decoding module being a sealed module mounted within a fuel tank of the vehicle and arraned so as normally to disable the vehicle fuel system and further arranged to respond to a predetermined access code being entered on the code entry module to enable the fuel system for normal running of the vehicle.

2. A vehicle security system as claimed in claim 1, in which the decoding module is arranged to open an electrically operable valve in a fuel line leading from the fuel tank.

3. A vehicle security system as claimed in claim 1, in which the decoding module is arranged to enable an electrical fuel pump in a fuel line leading from the fuel tank.

4. A vehicle security system as claimed in claim 1, in which the decoding module comprises a memory storing an individual code and a comparator for comparing a code entered on the code entry module with said stored code, and to enable the fuel system in the event of agreement between the entered code and the stored code.

5. A vehicle security system as claimed in claim 1, arranged to provide a signal for enabling an ignition coil of the vehicle in response to the predetermined code being entered on the code entry module.

6. A vehicle security system as claimed in claim 1, comprising means for changing the required access code using the code entry module.

7. A vehicle security system as claimed in claim 6, in which said code-changing means functions such that the decoding module responds alternatively to the previous access code until the new access code has been used a predetermined number of times.

8. A vehicle security system as claimed in claim 1, comprising means for enabling the decoding module upon entry of another predetermined code on the code entry module, to allow the fuel system to be enabled without entering the normally-required access code.

9. A vehicle security system as claimed in claim 1, comprising means for disabling the code entry module following a predetermined number of successive attempts to access the system if those successive attempts all fail.

10. A vehicle security system as claimed in claim 1, in which the code entry module comprises "engine start" and "engine stop" keys and means are provided to render these keys operative only after the system has been enabled by entry of the correct access code.

* * * * *